United States Patent Office 2,732,727
Patented Jan. 31, 1956

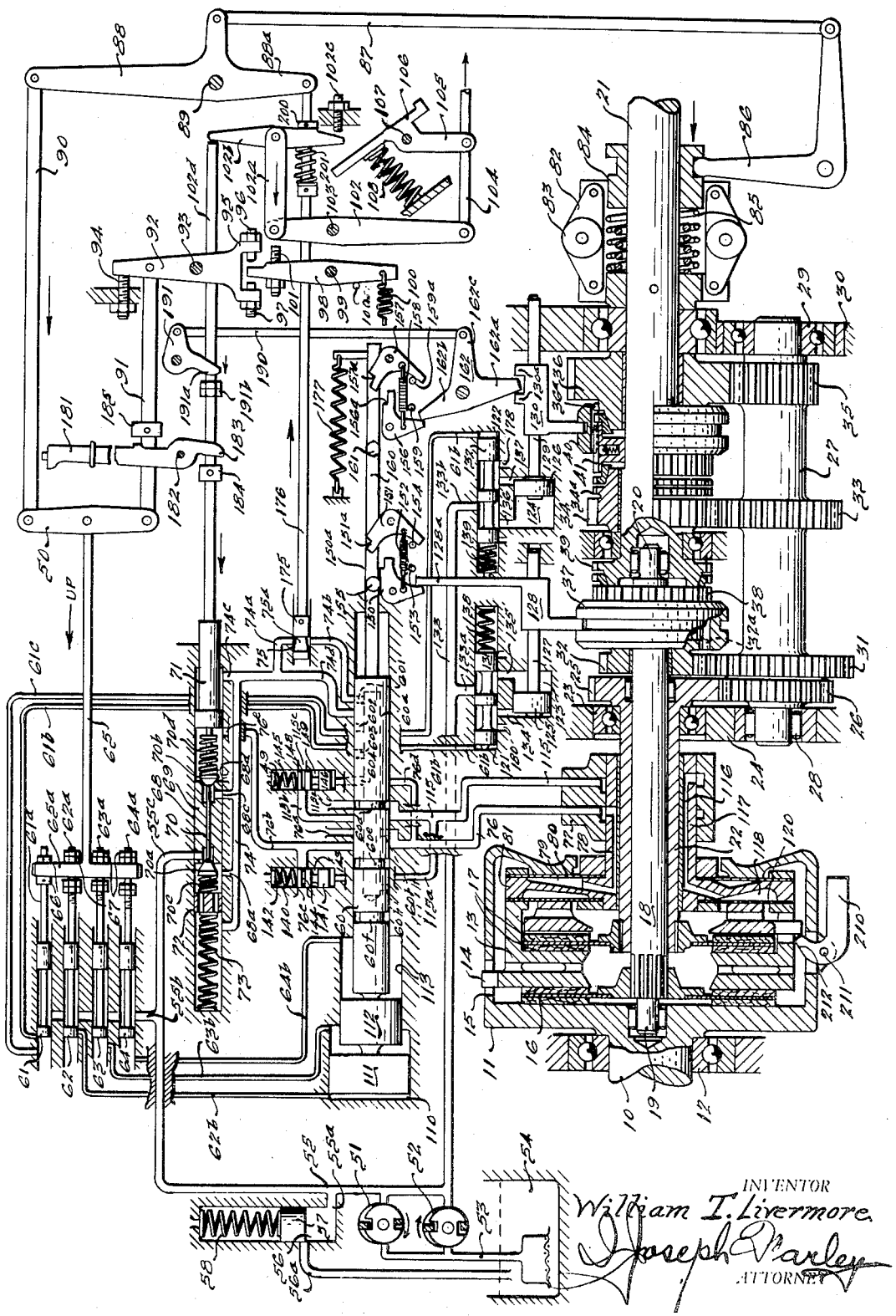

2,732,727

AUTOMATIC FLUID PRESSURE TRANSMISSION

William T. Livermore, Grosse Pointe Farms, Mich.

Continuation of application Serial No. 504,548, October 1, 1943. This application April 15, 1952, Serial No. 282,288

34 Claims. (Cl. 74—472)

This is a continuation application superseding application Serial No. 504,548, filed on October 1, 1943, now abandoned, conforming in all respects with such earlier application as finally allowed with 29 claims on November 8, 1951, and subsequently amended, except for the addition of new claims 30 and 31 in the present application.

This invention relates to automatic transmissions for automotive vehicles having a plurality of gear trains of different speed ratios interposed between the engine with which the vehicle is equipped and the driving wheels thereof, and wherein means are provided for causing a particular gear train to be made effective at any instant in accordance with various combinations of speed and throttle opening, as disclosed for example in my prior United States Letters Patent No. 2,120,104 granted June 7, 1938, disclosing a transmission of the broad general type above referred to, in which a plurality of fluid pressure actuated clutches are employed for rendering any particular speed ratio operative at any instant, the effective clutch pressure is graduated in accordance with the throttle opening, and means are provided to cause a shift from a higher to a lower speed ratio at a lower vehicle speed than when the corresponding shift from the same lower to the same higher speed ratio is effected.

Considered more specifically, the present invention relates to various improvements in the control system in a completely automatic transmission of the type above set forth.

In my prior patent above identified gear shifts are effected by, and under the control of, a differential mechanism actuated in accordance with the combined effect of vehicle speed and throttle opening which later factor is fairly representative of the demands for driving torque upon the engine at any particular instant. In said patent the variations in vehicle speed are communicated to the differential mechanism by suitable connections to a centrifugal speed governor connected to the propeller shaft of the vehicle.

Automatic fluid pressure transmissions of the type disclosed in said patent and also as disclosed in my prior United States Letters Patent No. 2,399,554 granted April 30, 1946, have certain definite characteristics which result from the use of a plurality of fluid pressure actuated clutches to render the different speed ratios effective. After a long period of experimentation with, and development of, such automatic transmissions, I have found it to be desirable to make provisions for the many different variations in the operating conditions of the vehicle to insure the highest efficiency of operation, to avoid any tendency towards sudden jerks in changing from one speed ratio to another, and also to take care of undesirable effects that result from departures from what may be termed normal driving conditions. Among these may be stated the following:

When a car is being driven at low speed, as for example when bringing the vehicle to a stop, it is desirable to have the clutch released quickly immediately upon the release of the engine throttle in order to avoid stalling of the engine or the necessity to make a manual shift into neutral when the vehicle is brought to a stop. When, however, the car is traveling at a high speed with the transmission operating in a high speed ratio and the engine throttle is released, it is desirable to have the clutch remain engaged so that the engine may act as a brake until the speed of the car has been considerably reduced. It is also desirable to have upshifts, that is from a lower to a higher speed ratio controlled by the differential effect of speed and load conditions but when a car is being driven normally with no heavy load placed upon the engine, and with the throttle only partially opened and with no great variation of the position of the throttle, it is then undesirable to make any changes in speed ratios. It is also desirable to incorporate means whereby downshifts will not be effected by the throttle except when it is opened beyond a predetermined point so that it will be possible to use the full engine torque, or nearly the full engine torque, in the higher speed ratios even at a low vehicle speed.

Other departures from normal conditions also occur for which provisions are made by the present invention and which will be hereinafter more fully described. It will be sufficient at the outset to state that it is among the objects of the present invention to incorporate in an automatic transmission of the type set forth—

(a) Means for effecting a free clutch release upon release of the engine throttle when the transmission is driven in low speed ratios but not when the transmission is operating in high speed ratios;

(b) To provide means for effecting a manual shift to a lower speed ratio which will be operative or effective only when the vehicle is being driven below a certain predetermined speed;

(c) To incorporate with the manual shift above set forth a mechanism for automatically applying the clutch pressure in order that the engine may be used as a brake when the transmission is in a low speed ratio;

(d) To incorporate means whereby upshifts, that is from a lower to a higher speed ratio, are controlled by the differential effect of speed and load conditions, whereas downshifts, that is from a higher to a lower speed ratio, are controlled by the differential effect only when the throttle is opened beyond a predetermined point such as that which prevails through what might be termed the middle range of the throttle opening and thus make it possible to use the full engine torque or nearly full torque even at low vehicle speeds;

(e) To provide means whereby a variable relation between clutch pressure and throttle opening at any instant is effected through a governor control in accordance with vehicle speed so as to insure sufficient clutch slippage for smooth starting and to secure shifts from one speed ratio to another speed ratio with less clutch slippage;

(f) To interpose a servo piston for the main selector valve operated by the main source of fluid pressure supply under the control of pilot valves connected to the differential lever in order to offer less resistance to the automatic operation of said lever;

(g) To provide choke means in the fluid pressure line for momentarily retarding the release of one fluid pressure clutch during a shift from one speed ratio to another until the other clutch starts to engage thereby to prevent speed-up of the engine during clutch shifts and the means for by-passing the choke after engagement of the second clutch, thus fully releasing the first clutch and preventing clutch drag;

(h) To provide means for retarding the clutch release during upshifts only and to insure a brief time interval between release of one clutch and engagement of the second clutch during downshifts, thus to permit the engine to speed up during such interval and bring about approximate synchronization of the driving and driven members of said second clutch, thereby to effect smooth clutch engagement and to prevent the backward jerking that inevitably results when clutch members connected to the car are traveling at higher speed than the engine clutch members as engagement of the clutch under such conditions causes the engine to produce a strong braking effect on the car;

(*i*) In addition to providing means for variations in the rate of clutch releases and clutch applications in accordance with vehicle speed, to provide different sets of fluid pressure connections to the clutch selector valve for directing the oil to the clutches through different sets of passages for upshifts than for downshifts and to provide means for stopping the selector valve in different positions for upshifts and downshifts to align it with the corresponding fluid pressure connections;

(*j*) To provide an interlocking means between the main selector valve and a synchronizer gear clutch so as to insure that the selector valve can be moved to establish a fluid pressure connection to one of the main fluid pressure actuated clutches only at such times as the synchronizer unit has been moved into engagement with the gear train driven by the particular fluid pressure clutch for the corresponding position of the selector valve;

(*k*) To so construct the said interlocking means that it will insure positive positioning of the main selector valve in its effective operative positions;

(*l*) To provide a series of small pilot valves which control fluid pressure passages to a servo piston as hereinbefore set forth which in turn operates the selector valve;

(*m*) To provide means for momentarily retarding the time of clutch application when the throttle is moved to a wide open position so as to permit the engine to speed up in starting before clutch engagement occurs thereby to prevent stalling of the engine;

(*n*) To improve upon the construction shown in my aforementioned Patent No. 2,399,554, wherein two fluid pressure actuated clutches are provided, one for establishing direct driving relationship between the engine and propeller shaft of the vehicle and the second fluid pressure clutch establishing change speed ratios between the engine and propeller shaft which speed ratios are selected while the first clutch is driving and to incorporate therewith the various interlocking variable time relationships of clutch applications and retarded clutch releases as hereinbefore set forth;

(*o*) To incorporate with the fluid pressure clutches counterweights operated by centrifugal forces for the purpose of counteracting increase of clutch applying pressures that would tend to result from the centrifugal force of the oil on the clutch actuating diaphragm;

(*p*) To provide a four speed transmission in which a pair of synchronizing gear elements are employed and low, or first speed, drive is effected through both of such synchronizers and wherein when the fourth, or high speed, overdrive is established, the low speed gears are driven slowly by the small overdrive output gear instead of at high speed by the large low speed output gear, as in previous constructions;

(*q*) To incorporate in a fluid pressure clutch transmission wherein diaphragms are employed for actuating the clutches, a new and improved construction whereby the diaphragms are mounted separately from the clutch assembly thereby to secure better cooling effects and avoid overheating;

(*r*) To provide means, whereby when a shift to a higher speed ratio is effected by closing the throttle, to bypass the choke means in the fluid pressure release passage, and thereby effect a quick release of the fluid pressure clutch which is then effective and thus prevent the engine from momentarily retarding the car as a result of the engine being driven by the car through a lower speed train during a clutch release.

The above and other objects of the invention will appear more fully from the following more detailed description and by reference to the drawing forming a part hereof wherein the figure is a diagrammatic view of an automatic transmission constructed in accordance with the principle of the present invention.

As shown in the drawing the numeral 10 indicates the driving shaft of a transmission which is preferably formed integral with a clutch housing 11, the shaft 10 being provided with means (not shown) for connection to the output shaft of an internal combustion engine. The shaft 10 is suitably mounted in antifriction bearings 12 of any desired type. Mounted within the clutch housing 11 is a main clutch element 13 in the form of a casting having projecting lugs 14 adapted to engage within suitable slots 15 provided in the cylindrical wall of the clutch housing 11 whereby said element will be driven with the clutch housing 11. Located between one face of the clutch element 13 and the side wall of the housing 11 is a driven clutch element 16, while a similar clutch element 17 is located on the other side of elements 13. When clutch element 16 is forced into driving engagement with element 13 and housing 11 by fluid pressure actuated means presently to be described, drive is effected to a driven shaft 18 having one end thereof piloted, as at 19, in the clutch housing 11 while the other end of said shaft 18 is similarly piloted, as at 20, in a propeller shaft 21. When the clutch 17 is engaged drive is effected through a sleeve 22 suitably supported in an antifriction bearing 23 mounted in the wall 24 of a transmission housing. The sleeve 22, as clearly shown in the drawing, projects into the transmission housing and has integrally formed on the end thereof a spur gear 25 that meshes with a gear 26 keyed, or otherwise nonrotatably secured upon a countershaft 27, the latter being mounted in antifriction bearings 28 and 29 supported in the front wall 24 and the rear wall 30 respectively of the said transmission housing. The countershaft 27 also carries a gear 31 that meshes with a gear 32 rotatably supported upon the pilot shaft 18 and the countershaft 27 also carries a gear 33 meshing with a gear 34 which is rotatably supported upon the propeller shaft 21. A fourth gear 35 carried by the countershaft 27 meshes with a gear 36 also rotatably supported upon the propeller shaft 21. The gear 32 has formed integrally with it clutch gear teeth 32–*a* for engagement with internal gear teeth formed in the synchronizer unit or sleeve 37 which internal gear teeth are in permanently meshed driving engagement with the teeth of a clutch gear member 38 formed integral with the pilot shaft 18 and upon which the synchronizer unit 37 is mounted for longitudinal sliding movement.

When the synchronizer unit 37 is in the position shown in the drawing with its internal gear teeth in engagement with the teeth 32–*a* of the gear 32, drive is effected through the clutch 16, pilot shaft 18 and gears 32, 31 to countershaft 27. When the synchronizer unit 37 is moved to the right, direct drive is effected to the clutch gear 39 formed integral on the inner end of the propeller shaft 21.

A similar synchronizer unit 40 is interposed between gears 34 and 36 which, as hereinbefore described, are mounted loosely upon the propeller shaft. Each of the synchronizer units 37 and 40 are of the conventional construction and include the usual synchronizing friction clutch and blocking cam teeth for insuring complete synchronization of the parts before a clutch operation is effected. The gears 34 and 36 are provided with clutch teeth 34–*a* and 36–*a* respectively with which the internal gear teeth of the synchronizer sleeve are adapted to mesh in accordance with the usual or standard construction of devices of this character.

It will be apparent from the foregoing that when the clutch 16 is engaged, the first or low speed drive will be established (when the synchronizer 37 is slid to the left in the drawing) through pilot shaft 18, gears 32 and 31 to countershaft 27 and with the synchronizer 40 shifted to the right, through gears 35 and 36 to propeller shaft 21. Second speed drive is effected, with clutch 17 engaged, through sleeve 22, gears 25 and 26 to countershaft 27 and, with synchronizer 40 still to the right, through gears 35, 36 to propeller shaft 21. Third speed, or direct drive, is established with clutch 16 in engagement, with synchronizer 37 shifted to the right and with synchronizer 40 to the left, whereby the drive is communicated through the pilot shaft 18, synchronizer 37 and gear 39 directly to propeller shaft 21, while fourth speed, or overdrive, is effected when clutch 17 is engaged through sleeve 22, gears 25, 26 to countershaft 27, and with synchronizer 40 to the left, through gears 33, 34 to propeller shaft 21.

Means are provided for actuating the clutch and synchronizer shift elements in accordance with variations in, and combinations of, vehicle speeds, and throttle openings which, as hereinbefore stated, are fairly indicative of driving torque conditions. Basically such control is effected by means of a differential lever 50 of the same general type as disclosed in my prior United States Patent No. 2,120,104 which, as shown in said patent, has a connection extending substantially from its center to a main selector valve and which connection also serves under certain conditions, as a pivotal fulcrum for the differential lever. As shown in the patent, a connection is made to one end of the differential lever from the accelerator pedal, the position of which is indicative of the extent of throttle opening, while connection is made to the other end of said lever from a governor connected to the propeller shaft of the vehicle and so that various combinations of throttle opening and vehicle speed determine the position of the main selector valve through which fluid under pressure is admitted to the various fluid pressure actuated clutches and gear shift devices, and/or synchronizer elements, the use of a shiftable element in combination with a selector valve being shown in my aforementioned United States Patent No. 2,399,554.

In accordance with the present invention, the differential lever is not connected directly to the main selector valve, nor to the accelerator pedal, but various modifications and improvements upon the basic structure are incorporated herein to insure better performance of the transmission as a whole.

In order to provide means for supplying fluid under pressure for operating the clutches and thereby starting the engine by pushing or towing the car in the event of a failure of the electric starter to function, such fluid under pressure is provided by the combination of a vehicle driven pump 51 suitably connected with the propeller shaft 21, or any other element, the rotation of which is indicative of the speed of the vehicle and a second pump 52 which is suitably connected with an element, the rotation of which is indicative of engine speed. These pumps are connected to a common intake conduit 53 leading to an oil sump 54. The pumps 51, 52 communicate with, and deliver fluid under pressure, to a main fluid pressure supply conduit 55 which communicates through a branch 55-a to an accumulator 56 having a piston 57 therein against which a compression spring 58 exerts a predetermined pressure. The accumulator 56 has a conduit 56-a connected to it which leads to the sump 54. Whenever the pressure of the fluid in the fluid supply line 55 exceeds a predetermined amount the piston 57 will be forced upwardly against the action of the spring 58 until the opening of the conduit 56-a is exposed which will thereby permit a portion of the fluid to be recirculated, or by-passed, back to the sump. This insures that the pressure of the fluid within the fluid supply line 55 will not only not exceed a certain predetermined amount but also that such pressure will be maintained high enough to insure effective operation of the transmission.

In accordance with the present invention, as with the transmission shown in my prior United States Patent No. 2,120,104, hereinbefore referred to, the use of a main selector valve 60 is contemplated. This valve, however, is not connected to the differential lever 50 but is caused to be actuated under the control of a plurality of small pilot valves 61, 62, 63 and 64, to which fluid under pressure from the supply conduit 55, is admitted through the branch conduit 55-b. As clearly shown in the drawing, each of the valves 61 to 64 inclusive is connected by means of the respective valve stems 61-a, 62-a, 63-a and 64-a to a laterally extending arm 65-a provided at one end of a connecting rod 65 which at its other end is connected to the center of the differential lever 50. The valve stem 61-a is connected to the arm 65-a by means of a pair of collars 66 while each of the valve stems 62-a, 63-a and 64-a are adjustably connected to the arm 65-a by adjustable nuts 67 and so that a certain degree of lost motion may occur between the arm 65-a and each of the respective valves 62, 63 and 64.

As indicated in the drawing, the pilot valve 62 controls the admission of fluid under pressure for operating the selector valve 60 from first to second drive, the pilot valve 63 for moving the selector valve to make a shift from second to third drive and pilot valve 64 to make the shift from third to fourth drive. The various parts are shown in the drawings in the starting position, all of the pilot valves 61, 62, 63 and 64 being in positions such that no fluid under pressure from the conduit 55-b is permitted to pass through the pilot valves to any outlet conduits which lead from the respective valve casings in which the said pilot valves are slidably mounted.

Fluid under pressure from the conduit 55, however, passes through the branch 55-c to a pressure control valve 68.

The function of the pressure control valve 68 is to vary the amount of pressure delivered to the fluid pressure clutch operating means. It will be readily understood that for the smooth clutch engagement the pressure of the fluid delivered to the clutches should be less for small throttle openings than for larger openings thereof. The pressure control valve 68 consists of a bushing 69 press fitted into the valve which has a small central bore in which is slidably received a small rod 70, one end of which abuts against a servo piston 71 and the other end of which abuts against a slidable apertured block 72, against which one end of the spring 73 abuts.

Slidably mounted on the rod 70 is a pair of mushroom shaped valves 70-a and 70-b which are urged towards valve seats provided in each end of the bushing 69 by valve springs 70-c and 70-d, the spring 70-c being confined between the end of the mushroom valve 70-a and the apertured plug 72 while the spring 70-d is located between the end of the valve 70-b and the servo piston 71, the pressure valve being operated by the accelerator pedal by means hereinafter to be more fully described through a series of links and levers so that when the accelerator pedal is depressed, the rod 102-d is pushd towards the left moving the plug 72 towards the left and thereby relieving the pressure of the spring 70-c on the valve 70-a. The fluid pressure in the conduit 55-c will therefore tend to raise the valve 70-a off its seat and the fluid under pressure will, therefore, flow through the branch 68-a to the conduit 74 and to the branch 68-c leading into the pressure control valve 68 under the valve 70-b. The springs 70-c and 70-d are of such strength and are compressed to such a degree, that the valve member 70-b will always hold any pressure admitted through valve 70-c but valve 70-b provides an outlet to reduce the pressure in conduit 74 whenever the throttle is released. With increases in throttle opening the movement of the stem 102-d towards the left reduces the compression of spring 70-c thereby allowing the pressure flowing to conduit 74 to build up until, when the throttle is wide open, the pressure in conduit 74 is the full value of the pressure available from the accumulator 57. When the throttle opening is reduced, the pressure of the spring 70-d will be relieved so as to permit the valve 70–b to be raised off its seat and thereby permit the pressure in the conduit 74 to be relieved by by-passing through conduit 68–c and passing the valve 70–b to flow to the sump through the branch conduit 68–d. The conduit 74 communicates to the branch conduits 74–d with the selector valve 60 and also through the conduit 74–a to a down choke valve 75 and thence to the conduit 74–b to the selector valve so that, depending upon the position of the selector valve, the fluid under pressure will flow to the means for actuating the clutches 16 and 17.

With the parts in the position as shown in the drawing, the orifice 601 of the selector valve is in alignment with the end of the conduit 74–b so that fluid will flow from said orifice to and through the bore 60–a of the valve to pass through the orifice 60–b to the conduit 76. The conduit 76 communicates through a collector ring 77 with a longitudinally extending groove 78 in the sleeve 22 to communicate with a fluid pressure chamber 79 formed between a diaphragm 80 and a diaphragm plate 81 mounted within the clutch housing 11 and connected to the clutch element 13. The pressure of the fluid will cause the clutch element 13 to be moved to the left to engage the clutch 16 and with the parts as shown, effect first or low speed drive through the pilot shaft 18 and gears 32, 31, countershaft 27 and gears 35, 36, to the propeller shaft 21.

Mounted on the propeller shaft is a centrifugal governor 82 having a plurality of weights 83 adapted when the propeller shaft is rotated, to be thrown outwardly and to move the sleeve 84 to the left against the action of the springs 85. Movement of the sleeve 84 under the influence of the governor weights is imparted to one arm of a bell crank lever 86, the other arm of which is connected by a connecting rod 87 to a three arm lever 88 pivotally mounted upon a fixed pivot 89. The upper arm of lever 88, as shown in the drawings, is connected by a rod 90 to one end of the differential lever 50. The other arm of the differential lever 50 is connected by a connecting rod 91 to a lever 92 pivoted intermediate its ends upon the stationary pivot 93. One of the lever 92 is adapted to bear against an adjustable stop 94, while the other end of the lever is formed as a yoke 95, the arms of which carry, for a purpose presently to be described, the adjustable stop screws 96, 97 between which projects one end of a lever 98 mounted upon a fixed pivot 99. The lever 98 is normally urged by a spring 100 to hold it in contact with a stop pin 100–a. The lever 98 also carries at its upper end an adjustable screw 101 which is adapted to be contacted by a lever 102 pivotally mounted upon a fixed pivot 103, the lever 102 being connected at its lower end, by means of a rod 104, with a lever arm 105 projecting downwardly from the accelerator pedal 106, the latter being pivoted at 107 and being normally urged by a spring 108 to the closed throttle position.

The upper end of lever 102 is connected by a link 102–a with a two armed lever 102–b, the lower end of which is adapted to engage with an adjustable stop 102–c and the upper end of which engages with the rod 102–d connected to the servo piston 71.

As will be seen from the foregoing, as the accelerator pedal 106 is depressed and with the engine started, fluid will be delivered through the clutch pressure control valve 68 and the selector valve to engage clutch 16 and effect first or low gear ratio drive to start the vehicle in motion. When the vehicle is in motion the action of the governor will be communicated to the differential lever 50 through the lever 86, connecting rod 87, lever 88 and connecting rod 90 to move the differential lever and connecting rod 65 towards the left to effect upshifts.

As it desirable in starting the vehicle, to have a certain amount of clutch slip for good starting, a small amount of depression of the accelerator pedal will move the upper ends of the levers 102, 102–b and rod 102–d to the left but a comparatively slight amount thereby relieving the pressure of the light spring 70–c. When the accelerator pedal has been depressed sufficiently to permit the fluid to pass through the pressure control valve to the conduit 74, part of such fluid will pass upwardly through the small branch conduit 74–c to the valve body 68 and behind the head of the servo piston 71 tending to move it towards the left with whatever pressure may at any time exist in the conduit 74. This tends to reduce the amount of pressure that would otherwise be required to be placed upon the accelerator pedal were it compelled to work against the full pressure of the springs 73 and 70–d in compressing the same until the full accumulator pressure passes to the line.

In order to avoid a condition where the main selector valve might stop upon a dead spot between ports, and secondly to allow for operation of smaller, easier moving valves by the governor and accelerator pedal, the small pilot valves 61, 62, 63 and 64 are provided fluid under pressure from the accumulator passing to this series of valves through the branch conduit 55–b. As clearly shown in the drawing, the valve 62 is connected by a fluid pressure supply conduit 62–b to a cylinder 110 in which a piston 111 is slidably mounted. The valve 63 is connected by a conduit 63–b to the right side of the cylinder 110 to act upon a piston 112 slidably mounted in a cylinder 113, while valve 64 is connected by a conduit 64–b to the right-hand side of the cylinder 113 into which the end of the selector valve 60 projects.

As the vehicle gains speed the rod 90 will be moved to the left under the action of the governor, thus moving the differential lever 50 to the left, carrying the rod 65 to the left and moving the series of pilot valves also to the left. After a slight amount of movement of the pilot valves, as will be clearly evident from an inspection of the drawing, the head of valve 62 will pass to the left sufficiently to place conduit 62–b in communication with conduit 55–b, thus permitting the fluid under pressure to flow to the left-hand side of cylinder 110 to act upon piston 111 and force it to the right, thus moving the selector valve to the right. When piston 111 has reached the right-hand end of cylinder 110 the orifice 60–b of the selector valve will be brought into alignment with the opening in the end of conduit 115 while orifice 602 of said valve will simultaneously align with the end of branch conduit 74–d. Fluid under pressure will therefore pass to conduit 115 which communicates through the collector ring 77 with a longitudinal conduit 116 provided in the sleeve 117, upon which said collector ring is mounted, thus permitting the fluid under pressure to pass to the pressure chamber 118 and exert pressure upon the diaphragm 120 and cause clutch 17 to be engaged. Second drive is then established through the sleeve 22, gears 25, 26, countershaft 27, and gears 35, 36.

Pilot valve 61 is connected by conduits 61–a and 61–b with the ends of synchronizer valve chambers 121 and 122 respectively which control the admission of fluid to a pair of cylinders 123, 124 in which are mounted pistons 125, 126. Piston 125 is connected by its piston rod 127 to a fork 128 which actuates the synchronizer 37 while piston 126 is connected by its piston rod 129 with a fork 130 for operating the synchronizer 40. Each of the synchronizer valve chambers contain a valve of similar construction, indicated by the reference characters 131 and 132, and the valve chambers 121 and 122 communicate with a main fluid pressure conduit 133 through the branch conduits 133–a and 133–b respectively. Communication between the valve chamber 121 and its respective cylinder is established through conduits 134 and 135 while similar communication is established between valve chamber 122 and its respective cylinder 124 through conduits 136 and 137. The valve 131 is normally urged by a spring 138 towards the left while the valve 132 is normally urged towards the right by a similar spring 139 so that each valve is urged towards that end of its valve chamber with which the conduits 61–a and 61–b respectively communicate.

In order to prevent speeding up of the engine during upshifts, means are provided to retard the release of one clutch until the other clutch begins to make contact. This is accomplished by providing for conduit 76, an upshift choke release valve 140 which is connected to the conduit 115 by means of the branch conduit 115–d, said release valve having a combined valve and piston member 141 slidably mounted therein and normally held by a spring 142 in closed position as shown in the drawings with the choke valve obstructing the free passage of the fluid from the conduit 76–b to conduit 76–c to the sump. When, however, fluid under pressure is admitted to the conduit 115, it passes through the conduit 115–d to the lower part of the casing of the choke valve 140 to actuate the combined piston and valve 141 against the action of the spring 142 and thereby establish communication from conduit 76 and 76–b through an annular conduit 143 formed in the piston 141 to the branch 76–c leading to the sump. During the time that fluid under pressure is being initially established to the conduit 115 the only avenue of escape for the fluid, which was formerly under pressure in conduits 76 and 76–b for establishing first drive, will be through a very restricted annular passage 144 in the combined valve and piston 141, but as pressure is being built up in the line 115 it will cause the valve 141 to be forced against the action of the spring 142 until substantially free communication is established between conduit 76 and the sump through the larger annular passage 143.

A similar valve 145 is provided for release of fluid in the conduit 115, said valve having a combined piston and valve member 146 with a large annular conduit 147 therein and the smaller restricted conduit 148; the valve casing 145 being connected by the branch conduit 76–d to the conduit 76. The combined piston and valve member 146 is normally held by the spring 149 with the restricted annular conduit 148 aligned with the branch 115–b of conduit 115 and with the branch conduit 115–c, which like the conduit 76–c, leads to the sump.

Means are provided for insuring that the selector valve will not be actuated to establish full fluid pressure communication to either of the clutches 16 or 17 to shift the gear from a lower to a higher speed, or vice versa, until the synchronizers 37 and 40 have been placed in the proper position to establish the next speed ratio and also to position and hold the selector valve in alignment with different sets of fluid pressure connections and passages for upshifts than for downshifts. Such means comprises a pair of dogs 150 and 151 which are normally held by a spring 152 against the stop pins 153, 154 respectively. These dogs at their upper ends are provided with notched ends 150–a and 151–a respectively adapted to be engaged by a pin 155 which projects laterally from the stem 160 of the selector valve 60. When the synchronizer unit 37 has been shifted towards the right and has fully engaged the teeth of gear 39, an arm 128–a which projects upwardly from the shifter fork 128 to lie between the lower ends of the dogs 150, 151, engages the lower end of the dog 151 and moves the same out of the path of the pin 155. The parts, however, are so arranged that the selector valve cannot be moved to establish communication of fluid pressure to the conduit 76 until the synchronizer unit 37 has been completely disengaged from the gear 32 and brought into full engagement with the gear 39.

Dogs, 156 and 157, similarly notched at 156–a, 157–a, likewise normally urged by a spring 158 into contact with pins 159, 159–a and adapted to cooperate with a pin 161 that also projects laterally from the stem 160 of the selector valve are provided for the synchronizer unit 140, the shifter fork 130 of which is provided with a pair of spaced lugs 130–a between which the lower arm 162–a of a three-armed lever 162 projects; the upper arm 162–b of said lever extending upwardly to lie between the lower ends of the dogs 156, 157. It will be noted that when either of the synchronizers 37 or 40 starts to move from the positions shown in the drawing the dog 150 or the dog 156 respectively swings upwardly to engage the notched end 150–a or 156–a behind the pin 155 or the pin 161 respectively so that during the movement of the synchronizer the selector valve will be locked against movement in either direction.

Just as it is important when an upshift is made from a lower to a higher speed to retard momentarily the release of the clutch effecting the lower speed ratio until the next clutch engages thereby to avoid speeding up of the engine during the upshift, it is likewise desirable to retard the rate of fluid application when effecting a speed change from a higher to a lower speed thereby to momentarily release the load of the engine and permit the engine to speed up to bring the clutches into approximate synchronism for downshifts and thus avoid sudden jerking which would take place if the engine were not running fast enough and had to be speeded up by the momentum of the car when the clutch engaged. In order to accomplish this, the downshift choke valve 75 is interposed between the branch conduits 74–a and 74–b. The movable valve member 175 mounted therein is connected by a valve rod 176 with the lower arm 88–a of the three-armed lever 88. Assuming the car has been driven in the fourth, or overdrive speed, and that the speed of the vehicle decreases to move the differential lever 50 towards the right, the valve 64 will first cut off the flow of pressure to the conduit 64–b and thus permit the selector valve to be urged towards the left by the spring 177 until the pin 161 contacts the upper end of dog 156 which because the synchronizer 40 was in its left-hand position is now in its uppermost position. The selector valve will therefore be stopped with its port 603 for third speed drive in alignment with the end of conduit 74–b, instead of with conduit 74–d while the annular conduit 60–c will be aligned with conduits 115 and 115–a. As a result the fluid under pressure will be released quickly to the sump through conduit 115–a while the down choke valve 75 will momentarily retard the flow of fluid under pressure through the selector valve and port 60–h to conduit 76. As soon as pressure is established through the conduit 76 to cause engagement of the clutch 16, third speed drive will then be effected again through shaft 18, and clutch gears 38 and 39 which have remained connected by the synchronizer unit 37 to effect direct drive to the propeller shaft 21. After the valve 64 shuts off the flow to the conduit 64–a and as the speed continues to decrease, the valve 61 will next cut off flow of fluid under pressure to the conduit 61–b thus permitting the synchronizer valve 132 to be moved towards the right under the influence of the spring 139 and thus permit fluid under pressure on the right-hand face of the synchronizer piston 136 to be relieved through the conduit 137 to conduit 178 leading to the sump, and will establish communication of fluid under pressure to the left-hand side of the piston 126 through conduit 135 and conduit 136, causing the synchronizer unit 40 to become disengaged from gear teeth 34–a and to be shifted towards the right for re-engagement with gear teeth 36–a of gear 36.

It will, of course, be understood that when the synchronizer unit 40 was in its extreme left-hand position to effect fourth speed drive, the upper end of the interlocking lever 162 had been moved to the right thus to permit the upper end of the dog 156 to move upwardly in the path of the pin 161 of the selector valve stem 160 and not until the synchronizer unit has moved to its extreme right-hand position, as shown in the drawings, will the dog 156 be moved out of the path of movement of the pin 161 to permit the selector valve to return towards the left. Downshift from third to second is effected as the speed of the vehicle decreases as the result of valve 63 cutting off the flow of fluid under pressure to the conduit 63–a thus causing the selector valve to move further towards the left under the influence of spring 177. The valve now being stopped by the engagement of pin 155 with the upper end of dog 150 with its port 602 aligned with conduit 74–b and with port 60–b aligned with conduit 115. Fluid will then flow through conduits 115 and 116 to pressure chamber 118 to cause clutch 17 to be re-engaged, thus to effect drive through sleeve 22, gears 25, 26, countershaft 27 and gears 35, 36, through the synchronizer unit 40 which now has been again shifted towards the right. Quick release of the pressure in conduit 76 is effected by the alignment of the annular conduit 60–c with conduits 76 and 76–a while the downshift choke valve 75 momentarily retards the flow of fluid to conduit 115. Likewise when the shift from second to first is made valve 62 cuts off communication to the conduit 62–a thus permitting the spring 177 to move the selector valve back to the position in which the parts are shown in the drawings, the fluid under pressure first passing through the downchoke valve 75 and by way of conduits 74–a, 74–b to port 601, bore 60–a, port 60–b through conduit 76 to cause clutch 16 to be engaged and drive effected through shaft 18, gear 38, synchronizer unit 37 and gears 32, 31 to countershaft 27 and gears 35, 36 to propeller shaft 21, it being understood that shortly before the valve 62 shuts off conduit 62–b, valve 61 shuts off conduit 61–b thus permitting the synchronizer valve 131 to be moved to the left by spring 138 to establish communication of fluid under pressure through conduits 133–a and 135 to the synchronizer cylinder 123 and the right-hand face of piston 125 therein, and permitting escape of fluid from the left-hand face of the piston through conduit 134 and conduit 180 to the sump.

From the foregoing description it will be seen that when the higher speed ratios are made effective, namely direct or third speed and overdrive, that gear shifts from direct to overdrive or vice versa are made by application and release of the clutches 17 and 16 without any shifting of the synchronizer units 37 and 40, both of which are maintained on the high side until the speed of the car is decreased to a point which brings about a gear shift to the slow or low speed ratios. The synchronizer units 37 and 40 are shown in the drawing in the position which they occupy for low speed ratios, namely, with the unit 37 shifted towards the left for engagement with the clutch gear teeth formed on the gear 32, and with the synchronizer unit 40 shifted towards the right for engagement with the clutch gear teeth 36–a formed integrally with the gear 36.

The present invention includes, as hereinbefore pointed out, means whereby the clutch pressure is graduated with throttle opening, such means including the valve 70–a and 70–b and valve springs 70–c and 70–d. It is desirable with an automatic transmission of the type to which the present invention relates that there be a free release of the clutches when the throttle is released, and when the transmission is operating in a low speed ratio, for example, when bringing the car to a stop and so that the engine will not be stalled when the speed gets to a very low point and when the car is brought to a full stop. It is, however, not desirable, when the car is operating in higher speed ratios, to release the clutch which at any instant may be engaged when the transmission is operating in high speed ratios. In order to prevent the free clutch release upon the release of the throttle when the car is operating in high speed ratios, the arm 162–c of the three arm lever that is connected with the synchronizer unit 40 has connected to it the lower end of a connecting rod 190, the upper end of which is connected to a bell crank lever 191, the end of the free arm 191–a of which is yoked to pass over the rod 102–d that leads to the pressure control valve. Suitably secured upon the rod 102–d adjacent to the arm 191–a of crank lever 190 is a pair of adjustable nuts 191–b.

It will be obvious from an inspection of the drawing that when the synchronizer unit 40 is shifted to the left for overdrive the three armed lever 162 will be rotated in a clockwise direction and the bell crank lever 191 similarly rotated so as to move the free arm 191–a thereof towards the left and hold the pressure control valve in a position such that clutch pressure sufficient to permit the car to drive the engine will be maintained in the fluid pressure line leading to either the clutch 16 or 17 whichever at any instant happens to be engaged, even though the throttle be released.

It is sometimes not only desirable, but under certain conditions imperative, as for example when the vehicle is traveling on a steep hill, to provide means whereby the engine may be used as a brake. Therefore, manual means are provided for effectuating a forced downshift but, however, as it would be highly undesirable to produce a forced manual downshift at high speed, the downshift means is so constructed that a manual downshift cannot be made effective until the speed of the vehicle has dropped below a certain predetermined limiting speed. As shown in the drawing, the manual downshift consists of a hand lever 181 pivoted as at 182 and having a lower forked end 183 for engagement with a collar 184 secured to the stem 102–d of the clutch pressure control valve. The hand lever 181 is adapted to engage at a point intermediate its ends with a collar 185 secured upon the rod 91. When the hand lever is actuated it will engage the collar 185 thus pulling the lower end of the differential lever towards the right and setting the pilot valves to make a lower gear effective. At the same time the lower forked end 183 of the hand lever 181 engages the collar 184 on the stem 102–d of the clutch pressure valve so as to insure that there will be sufficient clutch pressure to permit the engine to be used as a brake as there would otherwise be no clutch pressure when the throttle is entirely released.

It will of course be understood that the hand lever 181 has only a limited amount of motion. If the vehicle is operating at a very high rate of speed, the governor will have moved the differential lever in a counterclockwise direction and so that the limited amount of movement which the hand lever 181 is capable of imparting to the lower end of the differential lever will not be effective to move the valve rod 65 and the pilot valves connected thereto, an amount sufficient to produce a downshift.

It will also be understood that as the speed of the vehicle is increased as the result of the depression of the accelerator pedal, the lever 102 will be moved in a counterclockwise direction, the upper end of the lever engaging the adjustable stop 101 and positioning the upper end of the lever 98 in accordance with the extent of throttle opening. As the speed of the vehicle increases the action of the governor will cause the differential lever to be rotated in a counterclockwise direction, thus tending to move the lever 92 in a clockwise direction until the adjustable screw 96 engages the right-hand side of the upper end of the lever 98. This will prevent any further movement of the lower end of the differential lever 50 towards the right until further depression of the accelerator pedal 106 causes the upper end of the lever 98 to be moved to a new position, the screws 101 and 96 being made adjustable so as to determine the vehicle speeds at which the gear shift will occur, it being understood that as the car speed increases, the movement of the upper end of the differential lever 50 under the influence of the governor will cause the pilot valves to be actuated as hereinbefore described to effect the gear shifts and that the speeds at which the various gear shifts will be made will depend upon the position of the lower end of the differential lever as determined by the adjustment of the screws 101 and 96.

As the extent of throttle opening is to a certain degree a measure of the load conditions, the speeds at which the upshifts are made are determined by the differential effect of the speed of the vehicle as impressed upon the differential lever 50 from the governor and the extent of throttle opening. If the accelerator pedal is released, thereby permitting the throttle to close and the speed of the vehicle thereby decreased, the rod 90 will move towards the right, thereby actuating the differential lever 50 in a clockwise direction and thus pulling the rod 91 towards the left until the upper end of the lever 92 again abuts against the adjustable stop 94. When, therefore, the upper end of the lever 92 abuts the stop 94, the downshifts will be made solely under the influence of the governor, that is, in accordance with vehicle speed. If, however, the car is ascending an incline and with the throttle opened beyond a certain point, the upper end of the lever 98 will be positioned towards the left from the position shown in the drawings so that it will be in contact with the adjustable stop 97 on the left side of the lower yoked end of the lever 92, thus rotating the lever 92 clockwise from the position shown and pulling the lower end of the differential lever 50 towards the right. Obviously this will cause downshifts to be effected by the pilot valves at higher speeds for larger throttle openings than such shifts would occur for the closed position of the throttle and varying in accordance with the amount of throttle opening; the adjustment provided by the stop 97, permitting the transmission to be adjusted so as to change the rate of speed and rate of throttle opening at which the various shifts will be made.

It will be noted that there is a certain amount of lost motion provided between the opposed ends of the adjustable screws 96 and 97 so that the throttle may be opened to a considerable degree without effecting any change in the shifting speeds.

As hereinbefore pointed out, I have discovered, after considerable experimentation with automatic transmissions of the type to which this invention relates, that it is highly desirable, in order to effect smooth starting, that means be provided to insure a certain amount of clutch slippage for light throttle openings. This is effected by the clutch pressure control valve 68, the position of which relative to the throttle opening can be readily adjusted to produce light pressure at light throttle opening. If the relationship of throttle opening, however, is so adjusted as to secure the desired amount of clutch slippage for starting, it has been found that this amount of clutch slippage would be objectionable in making shifts from one gear ratio to another gear ratio, therefore means are provided for increasing the amount of pressure transmitted by the pressure control valve upon the initial movement of the governor after the vehicle starts to move. For this purpose the lower end of the lever 102–b is forked and straddles the rod 176 which is connected to the lower end of the three-arm lever 88, the forked lower end of the lever 102–b engaging a collar 200 on said rod 176 and being normally held by the spring 201 in engagement with said collar. When the vehicle is at rest with the parts in the positions shown in the drawing, if then the accelerator pedal 106 is depressed, the lever 102 will be rotated in a counterclockwise direction and will exert a pull upon lever 102–b tending to move it towards the left. The collar 200 will however act as a fulcrum for rotation of the lever 102–b also in a counterclockwise direction thus causing the contact of the upper end of lever 102–b against the rod 102–d to move the pressure control valve towards the left, as hereinbefore described.

When the vehicle starts in motion and the three-arm lever 88 is rotated by the governor also in a counterclockwise direction, the lower end 88–a of the lever 88 will obviously exert a pull upon the rod 176 thereby moving it and the stop collar 200 to the right. If the amount of depression of the accelerator pedal remains unchanged the lever 102–b will therefore pivot about its connection to the rod 102–a, thus causing the upper end of lever 102–b to move to the left, further actuating the pressure control valve and increasing the amount of pressure transmitted through it to operate the clutch. As the rod 176 and stop collar 200 are moved towards the right as just described, the lower end of the lever 102–b will be brought into engagement with the adjustable stop 102–c so that after this occurs any further movement of the three-arm lever 88 in a counterclockwise direction will merely result in compressing the spring 201 without any further movement of the lever 102–b taking place.

When the governor actuates the rod 176 towards the right, as just described, the down choke valve 75 secured to the end of the rod 176, is also moved to the right. It will be noted that the down choke valve 75 is provided with a tapered body portion 75–a so that as the speed of the car is increased the passage for the fluid past the choke valve 75 becomes more and more restricted. This results in increasing the time period required to engage a clutch during a downshift. This increases the length of time between the disengagement of one clutch and the application of another so that a greater time interval elapses at higher speeds than at lower speeds, thus permitting the engine to speed up and bring about approximate synchronization of the driving and driven members before the next clutch is engaged.

As it will be readily understood that the car will start more smoothly with wide open throttle if a certain time interval is permitted so as to permit the engine to speed up before full clutch engagement, the present invention also includes means whereby the rate of clutch application is retarded when the accelerator pedal is depressed to wide open position and such means comprise the apertured plug 72, heretofore described, which is mounted in the clutch pressure control valve 68. As will be obvious from an inspection of the drawings, depression of the throttle to wide open position obviously moves the rod 102–d towards the left to such an extent that the apertured plug 72 will be moved over the end of conduit 74 where it communicates with the clutch pressure control valve at the left-hand side thereof. Fluid under pressure, therefore, is compelled to flow through the more restricted conduit 68–a thus retarding the rate of clutch application and permitting the engine to speed up.

As hereinbefore pointed out, the release choke valves 140 and 145 are provided in order to normally retard the rate at which the clutches are released when upshifts are being made, that is from lower to higher speed ratio. If a gear shift is initiated while the car is in low speed by closing the throttle, the decrease in the speed of the engine would cause the engine to be driven by the vehicle and thereby exert a heavy braking effect upon the vehicle which results in very objectionable backward jerks. To obviate this condition the conduit 76–b which communicates through the release choke valve 140 also is connected through the branch 76–e with the clutch pressure control valve 68 just at the left of the servo piston 71 when the latter, as shown in the drawing, is in the position it occupies when the throttle is fully released. Therefore, the fluid under pressure in conduit 76–b is released through the branch conduit 76–e and the pressure control valve to the conduit 68–d that leads to the sump.

As the oil is fed under pressure to either of the pressure chambers 79 or 118 in the clutch housing 11, and as the clutch housing is being rotated at engine speed, the centrifugal effect produced upon the oil in said pressure chambers will normally tend to greatly increase the fluid pressure. Therefore, means are provided to counteract this pressure increasing tendency and such means consists of a plurality of counterweights 210 pivotally mounted as at 211 to the clutch housing 11. Rotation of the clutch housing tends to move the outer ends of the levers 210 away from the clutch housing and causes the inner curved end 212 of said counterweights to press against the movable element of the clutch 17 as shown. The amount of pressure exerted by the counterweights 210 obviously will vary with variations in the speed of the clutch housing and in accordance with the increase in oil pressures resulting from centrifugal forces.

It will be understood that as the centrifugal effects move the weights 210 outwardly, the inner ends 212 thereof will press against the movable element of clutch 17 thereby tending to relieve the pressure on said clutch, and that the pressure of the weights tending to move the movable element of clutch 17 towards the right is likewise communicated to the member 81 thereby tending also to release the pressure on clutch 16.

It will be noted that with the present transmission when the fourth or high speed overdrive speed ratio is effective the low speed gears 31, 32 and 35, 36 are driven slowly by the relatively small overdrive output gear 34 which acts as a pinion to drive the countershaft at comparatively low speed, instead of the countershaft 27 being driven by a large low speed output gear as in previous constructions, thereby reducing the churning effects of the oil in the transmission and therefore avoiding objectionable heating of the oil and also increasing the efficiency and insuring more quiet operation of the car.

Where reference is made in the above specification or appended claims to a condition of "coasting," it is intended to describe the condition where the vehicle is in motion with the accelerator released.

It will be understood that the transmission as hereinbefore described and as diagrammatically illustrated in the accompanying drawing, is but one satisfactory example of a transmission that has proven entirely successful in actual operation and that the foregoing description and the accompanying drawing is but illustrative of such satisfactory constructional example. It will, therefore, be understood that many changes, variations, and modifications of the constructional details illustrated and described may be resorted to without departing from the spirit of the invention as set forth in the claims hereunto appended.

I claim:

1. In a fluid pressure operated automatic transmission for a self-propelled vehicle having an output shaft, an engine, a throttle therefor and throttle actuating means, a plurality of power trains of different ratios interposed between said engine and output shaft, selectively operable gradually engageable coupling means for establishing drive through said power trains, fluid pressure means for actuating said coupling means, a pressure control valve, means for connecting said valve with the said throttle actuating means to vary the pressure of the fluid delivered to said fluid pressure means in accordance with the extent of opening of said throttle, including means for effecting release of the pressure delivered to said fluid pressure means when said throttle actuating means is operated to move said throttle to closed position, and means connected with a power train of high speed ratio to prevent release of the fluid pressure upon release of the throttle actuating means when said transmission is operating in said high speed ratio.

2. A fluid pressure automatic operated transmission of the type set forth in claim 1 in which is provided means for automatically selecting the power train to be effective at any instant in accordance with various combinations of vehicle speed and degree of throttle opening, means for effecting a manual shift from a higher to a lower speed ratio, means for rendering said manual shift effective only when said vehicle is being driven below certain predetermined speed, and means associated with said manual shift means and said pressure control valve for insuring sufficient pressure upon the coupling means made effective at any instant by said manual shift means so that the engine may be used as a brake when said manual shift means is effective.

3. In a fluid pressure operated automatic transmission for a self-propelled vehicle having an engine and a throttle therefor, a transmission input member driven by said engine, a plurality of fluid pressure actuated clutches driven by said input member, a plurality of gear trains of different gear ratios driven by said clutches, a transmission output shaft driven by said gear trains, means for automatically selecting the gear train to be effective for driving said vehicle at any instant in accordance with various combinations of vehicle speed and degree of throttle opening, said means including a floating lever, means operated in accordance with vehicle speed connected to one end of said floating lever, throttle actuating means and means connected thereto and to the other end of said floating lever including a lost motion connection whereby when said throttle is opened beyond a predetermined point automatic shifts from a lower to a higher speed ratio are controlled by the differential effect of speed and throttle position and shifts from a higher to a lower speed ratio are controlled by said differential effect when said throttle is opened beyond a predetermined point.

4. In a fluid pressure operated automatic transmission for a self-propelled vehicle having an output shaft, an engine, a throttle therefor and throttle actuating means, a plurality of power trains of different ratios interposed between said engine and output shaft, fluid pressure operated selectively operable gradually engageable coupling means for establishing drive through said power trains, a coupling pressure control valve, means connected with said throttle actuating means for actuating said valve and for providing a light coupling engaging pressure thereby to insure slippage for smooth starting, a governor responsive to vehicle speed, and connections from said governor to said pressure control valve for increasing the pressure of the fluid delivered to actuate said coupling means in response to increase in vehicle speed.

5. A fluid pressure operated automatic transmission as set forth in claim 4 in which means are connected with said governor to vary the time interval between the engagement of one coupling means and the disengagement of the other coupling means in accordance with vehicle speed.

6. In a fluid pressure operated automatic transmission for a self-propelled vehicle having an engine, a throttle therefor and throttle actuating means, a transmission input member driven by said engine, a plurality of fluid pressure actuated gradually engageable coupling means, a plurality of power trains of different ratios each effected by the release of one and engagement of another of said coupling means and driven by said input member, a transmission output shaft driven by said power trains, a coupling pressure control valve, a pump for delivering fluid under pressure to said coupling means, means for normally holding the pressure of the fluid delivered by said pump at a predetermined value, a selector valve communicating with said pump and said couplings, fluid pressure connections from the delivery side of said pump to said selector valve, a sump communicating with the intake side of said pump, fluid pressure conduits connecting said selector valve with said sump, and a valve interposed in at least one of said last-named conduits to control the rate of lower speed coupling release as said selector valve is actuated to effect a shift from a lower to a higher speed ratio, said valve being responsive to the establishment of coupling engagement for said higher speed ratio.

7. A fluid pressure operated automatic transmission, as set forth in claim 6, in which means are provided responsive to the effective fluid pressure for establishing said higher speed coupling engagement adapted to actuate said valve to a fast release position.

8. In a fluid pressure operated automatic transmission for a self-propelled vehicle having an engine, a transmission input member driven by said engine, a pair of fluid pressure actuated clutches driven by said input member, a pump for delivering fluid under pressure to said clutches, two pairs of gear trains each of different gear ratios, one pair driven by each of said clutches, a synchronizer gear clutch interposed between each clutch and the pair of gear trains therefor, fluid pressure actuated means for shifting said synchronizers to operative positions, a selector valve interposed between said pump, said clutches and said synchronizer actuating means, and interlocking means interposed between said selector valve and said synchronizer actuating means to limit movement of said selector valve when said synchronizer units are being shifted from one operative position to another operative position.

9. A fluid pressure operated transmission as set forth in claim 8 in which different sets of fluid pressure conduits are connected with said selector valve for effecting upshifts than for effecting downshifts and said interlocking means interposed between the synchronizer actuating means and the selector valve is provided with means for holding said valve in different positions to align with one set of conduits for upshifts and with the other set of conduits for downshifts.

10. A fluid pressure operated transmission as set forth in claim 8 in which different sets of fluid pressure conduits are connected with said selector valve for effecting upshifts than for effecting downshifts, the interlocking means interposed between the synchronizer actuating means and the selector valve is provided with means for holding said valve in different positions to align with one set of conduits for upshifts and with the other set of conduits for downshifts and connections between said interlocking means and said selector valve for insuring the positive positioning of said selector valve in correct alignment with said fluid pressure conduits.

11. In a fluid pressure operated automatic transmission for a self-propelled vehicle having an engine provided with a throttle and throttle actuating means therefor, a transmission input member driven by said engine, a plurality of fluid pressure actuated clutches driven by said input member, a plurality of gear trains of different gear ratios actuated by said clutches, a transmission output shaft driven by said gear trains, a synchronizer unit interposed between one of said clutches and a pair of said gear trains, one of which effects drive at a higher speed ratio than the other, fluid pressure actuated means for shifting said synchronizer unit to selectively render either one or the other of said pair of gear trains operative, a source of fluid under pressure, valve means communicating with said source of pressure and said fluid pressure actuated clutches and the fluid pressure actuated means for said synchronizer for causing said synchronizer unit to be held in position for effecting connection to the higher speed ratio until the speed of the vehicle drops below a certain point.

12. In a fluid pressure operated automatic transmission as set forth in claim 6 in which means is provided to by-pass said coupling release valve when said throttle actuating means is operated to close the throttle, thereby to effect a quick release of the fluid pressure clutch which is then effective and thus prevent the engine from momentarily retarding and exerting a braking effect upon the car.

13. In a fluid pressure operated automatic transmission for a self-propelled vehicle having an engine provided with a throttle and throttle actuating means therefor, a plurality of engageable coupling means, a plurality of power trains of different ratios established by engagement of said coupling means, means for automatically selecting the power train to be effective for driving said vehicle in accordance with various combinations of vehicle speed and degree of throttle opening, said means including a governor driven in accordance with vehicle speed, and means communicating with said automatic selecting means and said governor and said throttle actuating means for causing said automatic selecting means to be controlled by the differential effect of speed and throttle opening whenever said throttle is open beyond a certain predetermined amount and by speed only whenever the extent of opening of said throttle is less than said predetermined amount.

14. In a self-propelled vehicle having an engine and a propeller shaft, shiftable transmission gearing interposed between said engine and propeller shaft for effecting a plurality of gear trains of different ratios, a source of fluid pressure, fluid pressure actuated means for effecting shifts from one gear train to another, means varying with vehicle speed, means varying with torque requirements, and an automatic fluid pressure control system responsive during all normal acceleration to the differential effect of said means varying with vehicle speed and torque requirements for initiating shifts from one gear train to another, said control system being characterized by fluid pressure actuated valve means for admitting, blocking and exhausting the flow of fluid under pressure to and from said fluid pressure actuated means, and pilot valve means responsive to said differential effect during all normal acceleration in automatically determining shift points for admitting, blocking and exhausting the flow of fluid under pressure for actuating said fluid pressure actuated valve means.

15. In a fluid pressure automatic transmission for a self-propelled vehicle having an engine and a drive shaft, a plurality of selectively engageable power trains of different ratio adapted to establish drive between said engine and drive shaft, automatic control means for selecting appropriate ratios for varying driving conditions, including mechanism for automatically establishing a free-wheeling condition whenever said vehicle is coasting in a relatively low-speed drive ratio, mechanism for establishing a two-way drive connection whenever said vehicle is coasting in a relatively high-speed drive ratio, means for effecting a manually controlled shift from said relatively high to low speed drive, and mechanism actuated by said latter means adapted to maintain a two-way drive connection in said relatively low-speed ratio when said vehicle is coasting whereby engine braking in said low-speed ratio may be rendered effective by said manual shift.

16. In a fluid pressure operated automatic transmission for a self-propelled vehicle having an engine, a throttle therefor and throttle actuating means, fluid pressure actuated gradually engageable coupling means, a pressure control valve for varying engaging pressure with changes in throttle opening actuated by said throttle actuating means, said valve having characteristics causing it to increasingly resist actuation with increasing engagement pressure, and a servo mechanism actuated by said control valve varied pressure adapted to assist the actuation of said pressure control valve whereby the effort in operating said throttle actuating mechanism may be substantially reduced.

17. In a fluid pressure operated automatic transmission for a self-propelled vehicle having an engine, a throttle therefor and throttle actuating means, a plurality of fluid pressure actuated gradually engageable coupling means, a plurality of power trains of different ratio selectively established by said coupling means, a main selector valve for selecting the effective power train, servo valve means for actuating said selector valve, pilot valve means for actuating said servo valve, and means differentially responsive to variations in vehicle speed and throttle actuation for actuating said pilot valve means.

18. In a self-propelled vehicle having an engine and a drive shaft, a fluid pressure actuated transmission having a plurality of power trains adapted to establish different drive ratios between said engine and drive shaft, automatic control means adapted to select appropriate power trains for varying driving conditions, fluid pressure actuated clutch means for establishing drive through one of said power trains, said automatic control means including mechanism for regulating effective clutch actuating pressures, the actuating fluid in said clutch means being subject to centrifugal effects of rotation tending to increase clutch actuating pressures above those established by said regulating mechanism, and centrifugal means adapted to oppose said aforementioned centrifugal effects in a manner adapted to facilitate effective regulation of clutch engaging pressures.

19. In a self-propelled vehicle having an engine and a drive shaft, a fluid pressure actuated transmission having a plurality of power trains adapted to establish different drive ratios between said engine and drive shaft, automatic control means adapted to select appropriate power trains for varying driving conditions, fluid pressure actuated clutch means for establishing drive through one of said power trains, said automatic control means including mechanism varying with torque demand for regulating effective clutch actuating pressures, the actuating fluid in said clutch means being subject to centrifugal effects of rotation tending to increase clutch actuating pressures above those established by said regulating mechanism and centrifugally actuated weights adapted to oppose clutch engagement in a manner counterbalancing the centrifugal effects on said fluid in order to facilitate effective regulation of clutch engaging pressure.

20. In a fluid pressure automatic transmission for a self-propelled vehicle having an engine and a drive shaft, a plurality of selectively engageable power trains of different ratio adapted to establish drive between said engine and drive shaft, automatic control means for selecting and effecting appropriate power trains for varying driving conditions, including means changing with vehicle speed, means changing with torque demand, control means differentially responsive to said last two means adapted to control change in ratio, manual means for effecting a downshift from the highest speed ratio to the next lower speed ratio or a still lower speed ratio, and means changing with vehicle speed for determining the lower limit of the downshift speed ratio.

21. In a fluid pressure operated automatic transmission for a self-propelled vehicle having an engine, a throttle therefor and throttle actuating means, a transmission input member driven by said engine, a plurality of fluid pressure actuated gradually engageable coupling means, a plurality of power trains of different ratios established by engagement of said coupling means and driven by said input member, a transmission output shaft driven by said power trains, a coupling pressure control valve, a pump for delivering fluid under pressure to said coupling means, means for normally limiting the pressure of the fluid delivered by said pump, a selector valve communicating with said pump and said coupling means, separate fluid pressure conduits leading from the delivery side of said pump to said selector valve, a sump connected with the intake side of said pump, separate fluid pressure conduits leading from said selector valve to said sump, choke means for retarding the rate of coupling release in one of said last-named fluid pressure conduits, choke means provided in one of said first-named conduits for retarding the rate of coupling engagement, and means for stopping said selector valve in a position to make said one of said first-named fluid pressure conduits effective as said selector valve moves to effect a shift from a higher to a lower speed ratio and for stopping said selector valve in a different position, making said other fluid pressure conduits effective as said selector valve is moved to effect a shift from a lower to a higher speed ratio.

22. In a fluid pressure operated automatic transmission for a self-propelled vehicle having an output shaft, an engine, a throttle therefor and throttle actuating means, a plurality of power trains of different ratios interposed between said engine and output shaft, fluid pressure actuated selectively operable gradually engageable coupling means for establishing drive through said power trains, a main coupling selector valve, a governor driven in accordance with vehicle speed, differential means actuated by said throttle actuating means and said governor, servo piston means for actuating said selector valve, and a plurality of small pilot valves actuated by said differential means for controlling the admission of fluid to said servo piston means.

23. In a fluid pressure operated automatic transmission for a self-propelled vehicle having an output shaft, an engine, a throttle therefor and throttle actuating means, a plurality of power trains of different ratios interposed between said engine and output shaft, fluid pressure actuated selectively operable gradually engageable coupling means for establishing drive through said power trains, means for supplying fluid under pressure to said coupling means, a pressure control valve, a main selector valve, means for automatically actuating said selector valve in accordance with various combinations of vehicle speed and degree of throttle opening for selectively governing the admission of fluid under pressure to said coupling means, means for controlling said pressure control valve to establish a rate of flow of fluid to said coupling means for normal operation, and means associated with said pressure control valve and with said throttle actuating means to restrict the rate of flow of fluid to said coupling means when said throttle actuating means is moved to wide-open throttle position thereby to produce variations in the time rate of coupling engagement in combination with variations of coupling engagement pressures.

24. In a self-propelled vehicle having an engine and a propeller shaft, a pair of gradually engageable coupling means and transmission drive trains of different ratios interposed between said engine and propeller shaft, a shift from one power train to another requiring the coordinated release of one coupling means and application of the other including a relatively more overlapping engagement during an upshift than during a downshift, means for actuating the respective coupling means, means for initiating shifts from one power train to another, and automatic control means for regulating the rate of coupling application and release required to effect such shifts, said control means being characterized by automatic mechanism for effecting a relatively different timing in the release and application of said respective coupling means during an upshift from that effected during a corresponding downshift, said mechanism tending to produce overlapping engagement during an upshift and no overlapping engagement during a downshift.

25. In a self-propelled vehicle having a throttle controlled engine and a propeller shaft, a plurality of power trains of different ratios interposed between said engine and propeller shaft, a source of fluid pressure, fluid pressure actuated means for effecting changes in ratio, means varying with vehicle speed, throttle control means, differential means responsive to said last two means, and an automatic fluid pressure control system for initiating ratio change, said control system being characterized by fluid pressure actuated valve means for directing the flow of ratio changing fluid pressure, and pilot valve means for actuating said first valve means, said pilot valve means being responsive to said differential means.

26. In a fluid pressure operated automatic transmission for a self-propelled vehicle having an engine, a throttle therefor and throttle actuating means, a plurality of fluid pressure actuated gradually engageable coupling means, a plurality of power trains of different ratios effected by engagement of said coupling means, a main selector valve for selecting the effective power train, a governor driven in accordance with vehicle speed, differential means and connections therefrom to said governor and throttle actuating means, servo piston means for actuating said selector valve, and pilot valve means actuated by said differential means controlling the admission of fluid to said servo piston means.

27. In a fluid pressure operated automatic transmission for a self-propelled vehicle having an engine, a throttle therefor and a propeller shaft, a plurality of selectively operative power trains of different ratio adapted to establish drive between said engine and propeller shaft, means changing with vehicle speed, means changing with throttle opening, means differentially responsive to said last two means during normal acceleration for automatically controlling ratio change under the influence of various combinations of vehicle speed and degree of throttle opening, means adapted to control downshifts in response to vehicle speed alone when said throttle has been closed beyond a predetermined minimum position, and means for rendering changes in throttle opening ineffective to influence upshifts throughout a predetermined initial range of throttle opening.

28. In a fluid pressure operated automatic transmission for a self-propelled vehicle having an engine, a throttle therefor and a propeller shaft, a plurality of power trains of different ratios adapted to establish drive between said engine and propeller shaft, means changing with vehicle speed, means changing with throttle opening, means differentially responsive to said last two means during normal acceleration for automatically controlling ratio change under the influence of various combinations of vehicle speed and degree of throttle opening, means for inducing a downshift from high speed ratio limited to a condition of relatively wide-open throttle when the vehicle speed exceeds a predetermined minimum, and means for inducing a downshift from high speed ratio limited to decreasing vehicle speed below a relatively low speed when said throttle is closed to idling position.

29. In an automatic transmission for a self-propelled vehicle having an engine and a drive shaft, a plurality of parallel selectively engageable power trains of different ratio adapted to be selectively driven or to idle at speeds corresponding to driving speeds, a selectively releasable friction clutch element associated with a relatively low speed train, a second engageable coupling means associated with a relatively high speed train, means other than release of said clutch element for disconnecting said relatively low speed train from the power train when drive is established through said high speed train, said other disconnecting means being located to avoid the rotation of the released element of said low speed clutch at relatively high idling speed while power is transmitted through said high speed train.

30. In a fluid pressure operated automatic transmission for a self-propelled vehicle having an engine, a transmission input member driven by said engine, a plurality of fluid pressure actuated gradually engageable coupling means, a plurality of power trains of different ratios driven by said input member, a transfer from one power train to another being effected by the release of one and engagement of another of said coupling means, a transmission output shaft driven by said power trains, a source of pressure for actuating said coupling means, a movable selector valve for directing the application and release of coupling pressure in transferring drive from one power train to another, passages for admitting and exhausting pressure communicating with the respective coupling means to be applied and released upon movement of said selector valve to a new ratio position, a valve interposed in one of said passages for coordinating the timing of transfer of coupling engagement, said valve initially obstructing and finally opening flow through said passage, and said valve being actuated by change in pressure in the other of said passages.

31. In a fluid pressure operated automatic transmission for a self-propelled vehicle having an engine, a transmission input member driven by said engine, a plurality of fluid pressure actuated gradually engageable coupling means, a plurality of power trains of different ratios driven by said input member, a transfer from one power train to another being effected by the release of one and engagement of another of said coupling means, a transmission output shaft driven by said power trains, a source of pressure for actuating said coupling means, a movable selector valve for directing the application and release of coupling pressure in transferring drive from one power train to another, passages for admitting and exhausting pressure communicating with the respective coupling means to be applied and released upon movement of said selector valve to a new ratio position, a valve interposed in one of said passages for coordinating the timing of transfer of coupling engagement by controlling the flow therethrough, said valve being responsive to the effective pressure in the other of said passages.

32. In a self-propelled vehicle having an engine and a drive shaft, a fluid pressure actuated transmission having a plurality of power trains adapted to establish different drive ratios between said engine and drive shaft, fluid pressure actuated gradually engageable means employed in effecting a downshift from a higher to a lower speed ratio, fluid pressure control means for effecting engagement of said last means, vehicle speed responsive means, valve means for regulating the rate of engagement of said fluid pressure actuated means, and means actuated by said vehicle speed responsive means for controlling said valve means to reduce the rate of engagement with increase of vehicle speed.

33. In a fluid pressure operated automatic transmission for a self-propelled vehicle having an engine, a transmission input member driven by said engine, a plurality of fluid pressure actuated gradually engageable coupling means, a plurality of power trains of different ratios driven by said input member, a transfer from one power train to another being effected by the release of one and engagement of another of said coupling means, a transmission output shaft driven by said power trains, a source of pressure for actuating said coupling means, a movable selector valve for directing the application and release of coupling pressure in transferring drive from one power train to another, passages for admitting and exhausting pressure communicating with the coupling means to be applied and released upon movement of said selector valve to a new ratio position, a valve interposed in one of said passages for coordinating the timing of transfer of coupling engagement by controlling the flow therethrough, said valve being responsive to the effective pressure in the other of said passages.

34. In a self-propelled vehicle having an engine and a drive shaft, a fluid pressure actuated transmission having a plurality of power trains adapted to establish different drive ratios between said engine and drive shaft, fluid pressure actuated gradually engageable means employed in changing speed ratio, fluid pressure control means for effecting engagement of said last means, vehicle speed responsive means, valve means for regulating the rate of engagement of said fluid pressure actuated means, and means actuated by said vehicle speed responsive means for controlling said valve means to reduce the rate of engagement with increase of vehicle speed.

References Cited in the file of this patent

UNITED STATES PATENTS

| | | |
|---|---|---|
| 1,938,914 | Kress | Dec. 12, 1933 |
| 2,242,765 | Stein | May 20, 1941 |
| 2,297,480 | Kratzmann | Sept. 29, 1942 |
| 2,328,091 | Nutt et al. | Aug. 31, 1943 |
| 2,376,545 | Livermore | May 22, 1945 |

FOREIGN PATENTS

| | | |
|---|---|---|
| 432,137 | Germany | July 31, 1926 |